T. MUIR.
Butter-Worker.
No. 206,036. Patented July 16, 1878.
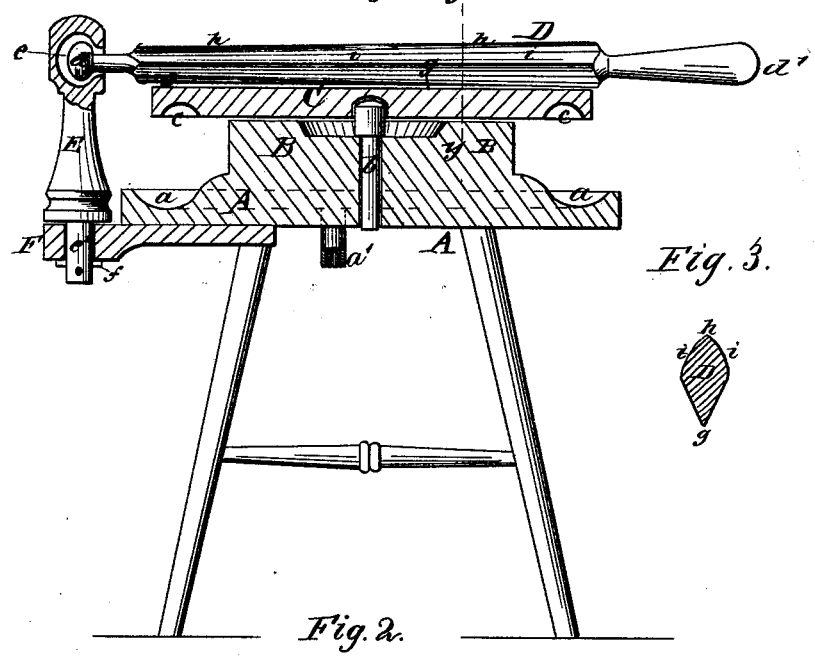
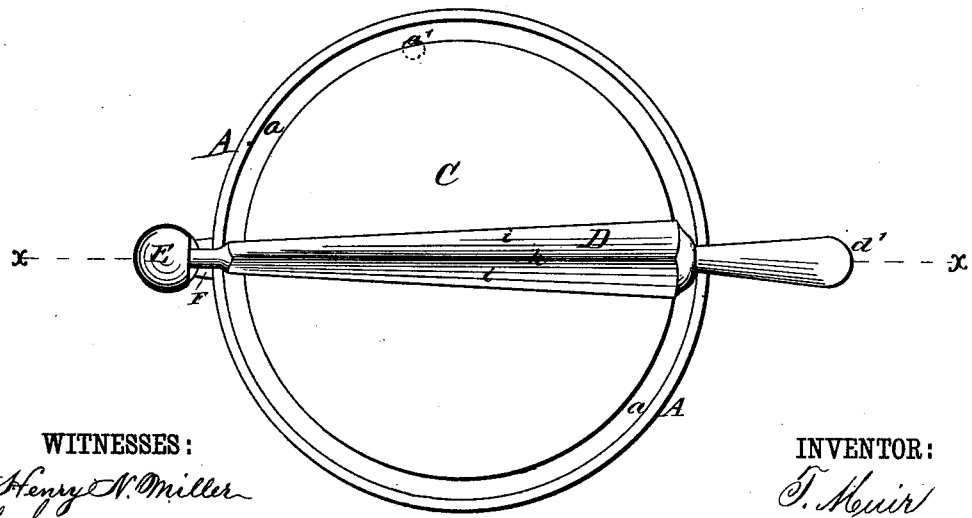
WITNESSES:
Henry N. Miller
C. Sedgwick
INVENTOR:
T. Muir
BY Munn & Co
ATTORNEYS.

UNITED STATES PATENT OFFICE.

THOMAS MUIR, OF ANDES, NEW YORK.

IMPROVEMENT IN BUTTER-WORKERS.

Specification forming part of Letters Patent No. 206,036, dated July 16, 1878; application filed May 25, 1878.

*To all whom it may concern:*

Be it known that I, THOMAS MUIR, of Andes, in the county of Delaware and State of New York, have invented a new and Improved Butter-Worker, of which the following is a specification:

My invention relates to that class of butter-workers in which the butter is operated upon by a hand-lever on a rotating table, the object being to so improve the construction of the working-lever and the supporting-table that the grain of the butter will be good and uniform, without tendency to become oily, and that the rotating table shall not be clogged up by milk getting in between the same and the supporting-table, but that facility shall be afforded for turning the same.

The invention will first be described in connection with the drawing, and then pointed out in the claim.

In the accompanying drawing, Figure 1 represents a vertical section of my improved butter-worker, the section being taken on the line $x\ x$ of Fig. 2. Fig. 2 is a top view of the same. Fig. 3 is a detail cross-section of the lever on the line $y\ y$ of Fig. 1, with the sharpest edge down.

Similar letters of reference indicate corresponding parts.

A is the circular stationary table, on which is formed an annular groove or gutter, $a$, with a discharge-pipe, $a'$.

B is a circular central disk, formed or attached on the table A, and provided with a central pivot, $b$, upon which the circular table C is fitted to rotate while resting upon the elevated surface of the disk B. The rotating table C has an annular groove, $c$, upon its under side.

D is the working-lever, provided at one end with the handle $d'$, and at the other end with a narrower part or neck ending with a ball, $d$, which fits into a socket, $e$, in the upper end of the post E, in such position that the edge of the working-lever can be brought down flush upon the table C.

The lower end of the post E is swiveled by the pivot $e'$ in a hole in an arm or a lug, F, secured to the table A, and is prevented from being raised out of the said lug by a cross-pin, $f$.

The working lever or knife D is made of the shape of cross-section shown in Fig. 3, having a diamond form, with one edge, $g$, left sharp, and the opposite edge, $h$, made blunt by curving the sides $i\ i$ convexedly to converge to the point $h$. The hand-lever D is turned in the socket $e$ to present either the sharp edge $g$ to the surface of the table C for working hard butter or the blunt edge $h$ for working soft butter. The lever can also be raised and lowered by turning it in the socket $e$, and swung horizontally on the swivel $e'$ and in the socket $e$ to reach any part of the table C. The lever D, being of the shape described, does not destroy the grain of the butter.

The table C, projecting beyond the circumference of the hub or disk B, is easily accessible to be turned by hand, and the milk pressed out of the butter flows down into the annular trough or gutter $a$, and is collected through the outlet $a'$ without any chance of entering past the groove $c$ in between the table C and the disk B to stick and prevent the movement of the table C.

Having thus described my invention, what I claim as new, and desire to secure by Letters Patent, is—

The combination of the circular rotating table C, having the annular groove $c$ on its under side, with the circular guttered supporting-table A, provided with the elevated disk B, upon which the table C is pivoted, said disk B being smaller in diameter than the rotating table C, substantially as and for the purpose set forth.

THOMAS MUIR.

Witnesses:
 CASSIUS M. SHAW,
 BARNA JOHNSON.